(12) United States Patent
Eisenhut et al.

(10) Patent No.: US 9,643,634 B2
(45) Date of Patent: May 9, 2017

(54) CLEANING CART

(71) Applicant: CARL FREUDENBERG KG, Weinheim (DE)

(72) Inventors: Andreas Eisenhut, Pullach (DE); Markus Rueckheim, Griesheim (DE); Torsten Gratzki, Essen (DE); Steve Barber, Manchester (GB); Jens Deerberg, Essen (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 14/893,551

(22) PCT Filed: May 21, 2014

(86) PCT No.: PCT/EP2014/001370
§ 371 (c)(1),
(2) Date: Nov. 24, 2015

(87) PCT Pub. No.: WO2015/003761
PCT Pub. Date: Jan. 15, 2015

(65) Prior Publication Data
US 2016/0159382 A1 Jun. 9, 2016

(30) Foreign Application Priority Data
Jul. 12, 2013 (DE) .................. 10 2013 011 632

(51) Int. Cl.
*B62B 3/10* (2006.01)
*B62B 3/08* (2006.01)
(Continued)

(52) U.S. Cl.
CPC .............. *B62B 3/08* (2013.01); *A47L 13/50* (2013.01); *A47L 13/51* (2013.01); *B62B 3/02* (2013.01);
(Continued)

(58) Field of Classification Search
CPC .... B62B 3/02; B62B 3/04; B62B 3/08; B62B 3/10; B62B 3/104; B62B 3/007; A47L 13/50; A47L 13/51
(Continued)

(56) References Cited

U.S. PATENT DOCUMENTS 7,587,784 B2 *   9/2009   Duncan ................... A47L 13/58
                                                                15/261
8,181,974 B1 *   5/2012   Galvan ..................... B62B 3/10
                                                               280/47.19
(Continued)

FOREIGN PATENT DOCUMENTS

DE          7213268 U       7/1972
DE          10003138 C1     5/2001
(Continued)

*Primary Examiner* — John Walters
(74) *Attorney, Agent, or Firm* — Leydig, Voit & Mayer, Ltd.

(57) ABSTRACT

A cleaning cart has a basic body, wherein the lateral extent of the basic body is bounded by an outer circumferential boundary surface or boundary line, and wherein the basic body bears at least one module which is coupleable to the basic body, is configured such that cleaning cart can bear a multiplicity of modules of different size while having a very compact and space-saving design, in that the module is assigned to the basic body in such a positive, frictional and/or non-positive manner preventing tilting that the base region of the module projects at least on one side beyond the boundary surface or boundary line of the basic body.

19 Claims, 2 Drawing Sheets

(51) Int. Cl.
*A47L 13/51* (2006.01)
*A47L 13/50* (2006.01)
*B62B 3/02* (2006.01)
*B62B 3/04* (2006.01)

(52) U.S. Cl.
CPC ............... *B62B 3/04* (2013.01); *B62B 3/10* (2013.01); *B62B 2202/50* (2013.01)

(58) Field of Classification Search
USPC ............ 280/47.34, 47.35, 79.11, 79.5
See application file for complete search history.

(56) References Cited

U.S. PATENT DOCUMENTS

| | | | |
|---|---|---|---|
| 8,381,931 B1* | 2/2013 | Ernest, III | B62B 3/10 206/518 |
| 8,544,141 B1* | 10/2013 | Kyde | A47J 47/18 15/257.7 |
| 2002/0195782 A1 | 12/2002 | Cates et al. | |
| 2007/0267832 A1 | 11/2007 | Denissov | |
| 2011/0133417 A1* | 6/2011 | Rouillard | A47L 13/51 280/35 |
| 2011/0169249 A1 | 7/2011 | Lindner et al. | |

FOREIGN PATENT DOCUMENTS

| | | |
|---|---|---|
| DE | 102005044984 B3 | 1/2007 |
| FR | 1438546 A | 5/1966 |
| GB | 2388577 A | 11/2003 |
| WO | WO 2007047214 A2 | 4/2007 |

\* cited by examiner

CLEANING CART

CROSS-REFERENCE TO RELATED APPLICATIONS

This application is a U.S. national stage application under 35 U.S.C. §371 of International Application No. PCT/EP2014/001370, filed on May 21, 2014, and claims benefit to German Patent Application No. DE 10 2013 011 632.5, filed on Jul. 12, 2013. The International Application was published in German on Jan. 15, 2015, as WO 2015/003761 A1 under PCT Article 21(2).

FIELD

The invention relates to a cleaning cart.

BACKGROUND

These types of cleaning carts are already known from the prior art. Patent DE 10 2005 044 984 B3 discloses a cleaning cart which comprises a frame produced from combinable and releasably connectable elements.

The frame forms projecting installation areas onto which modules, such as, for example, buckets, can be placed. The lateral extent of the installation spaces, namely the extent in the plane, is defined by rod assemblies, between which struts extend.

In general, the majority of cleaning carts operate with a base plate or base structure onto which or in which the modules can be positioned.

An essential point in the case of the prior art is that the boundary line or boundary surface of the cleaning cart protrudes beyond the modules situated thereon at least in the bottom region of the module.

In some cases the upper, wider part of modules which open conically from bottom to top can project in part over the boundary surface or the boundary line of the cleaning cart.

In every case, however, the bottom region of the module, e.g. a bucket bottom, is always inside the boundary surface or boundary line of the cleaning cart.

It is also known from the prior art for a module not to stand on a base plate, but to be suspended between the cross struts. The boundary surface or boundary line of the cleaning cart is provided in the majority of cases by four wheels, that is to say is at least as large as the rectangle that is spanned by the wheels.

The installation spaces of the cleaning cart of the prior art, as platforms, are relatively protruding and have to be adapted to the size of the modules or buckets. As a result, the compactness of a cleaning cart is determined by the dimensions of the modules to be conveyed.

SUMMARY

An aspect of the invention provides a cleaning cart, comprising: a basic body, wherein a lateral extent of the basic body is defined by an outside peripheral boundary surface or boundary line, wherein the basic body includes a module coupleable to the basic body, wherein the module is arranged on the basic body in such a positive-locking, frictional, and/or friction-locking manner so as to be tip-resistant that a module bottom region projects beyond the boundary surface or the boundary line of the basic body at least on one side.

BRIEF DESCRIPTION OF THE DRAWING

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
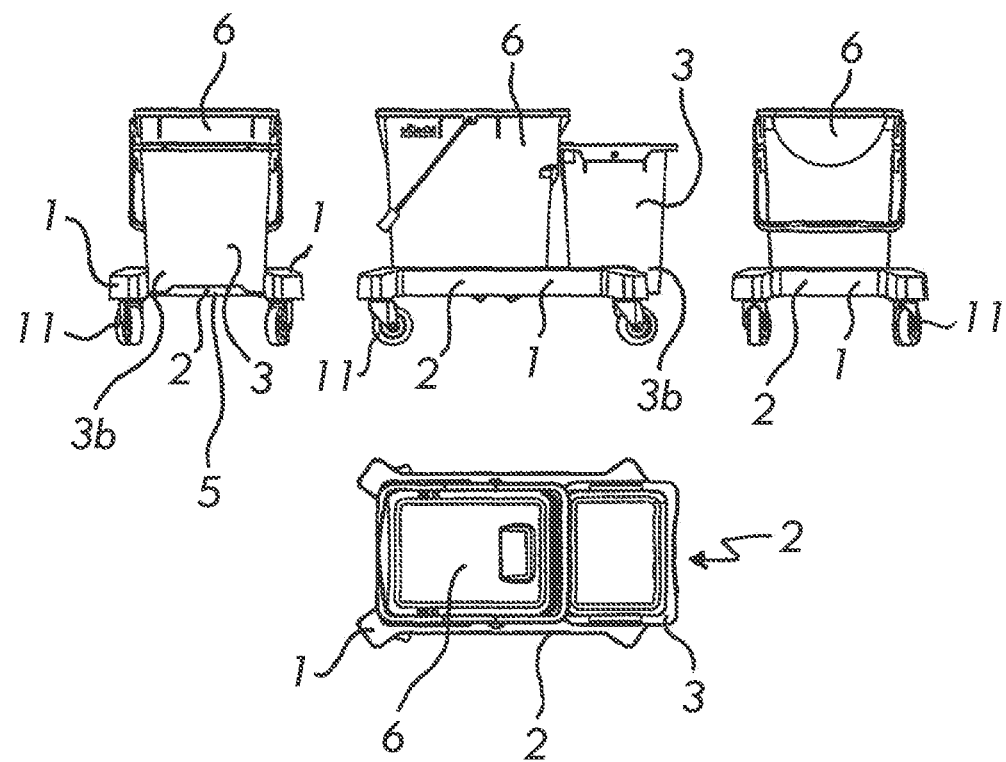
FIG. 1 shows four views of a cleaning cart, including a basic body on which two modules are arranged

An aspect of the invention, consequently, is to develop and further develop a cleaning cart of the type mentioned in the introduction in such a manner that said cleaning cart is able to support a plurality of differently sized modules in a very compact and space-saving design.

A cleaning cart according to the invention includes a basic body, wherein the lateral extent of the basic body, namely the extent in the plane, is defined by an outside peripheral boundary surface or boundary line and wherein the basic body carries at least one module which is couplable to the basic body. According to the invention, it is provided that the module is assigned to the basic body in such a positive-locking, frictional and/or friction-locking manner so as to be tip-resistant that the bottom region of the module projects beyond the boundary surface or the boundary line of the basic body on at least one side.

According to the invention, it has been recognized that as a result of a positive-locking, frictional and/or friction-locking connection, it is possible to achieve a type of clamping action which fixes a relatively large module on the basic body. Although a protruding module overlaps the basic body or projects beyond it at the side and does not rest completely inside a surface spanned by the boundary line thereof, the module is able to be carried and transported securely. In this respect, a cleaning cart of the type mentioned in the introduction is developed and further developed in such a manner it is able to support a plurality of differently sized modules in a very compact and space-saving design.

A boundary surface or boundary line within the context of said description is to be understood as the maximum extent of the basic body in the plane.

The basic body could provide support to at least one module in the vertical direction, wherein the tilt stability of the module is provided by a predominantly vertical positive-locking connection between the basic body and the module. Several modules can also be supported and held so as to be tip-resistant by means of a positive-locking connection.

At least one recess in which the module is inserted is realized in the basic body. The module can be connected to the basic body by a plug-in connection.

Holes or bores, into which pins or domes of the module are insertable, can be realized in the basic body or in a plate. The pins or domes are arranged in a preferred manner on the bottom region of the module.

The module could engage in the recess by way of part of its body, wherein another part projects beyond the boundary surface or boundary line. As a result of this measure, several modules, which, strung together in a row, would cover a larger surface than the basic body, can be fixed in the basic body.

Against said background, the basic body could comprise at least one saddle strut onto which the module is fitted, wherein the module encompasses the saddle strut in a u-shaped manner with two leg elements. The module is secured against tilting as the leg elements thereof abut against the saddle strut on both sides, preferably in a flat manner. One leg element could additionally also abut against an inner main web by way of one side surface in order to realize a positive-locking connection.

At least two modules could be received in the basic body, wherein a first module is supported against a second module against tilting about a predominantly horizontal axis. As a result, a multiple positive-locking connection can be realized, namely on one side on the saddle strut and/or on an inner main web and on the other side as a result of abutting against another module. As a result of this development, a module can only abut against a saddle strut with one leg element, wherein the module abuts in a supported manner against a further module by way of a further part of its body.

Against said background, at least two modules could be received in the basic body, wherein the modules are realized in a complementary manner with respect to one another such that they abut against one another thus forming a positive-locking connection. It is definitively conceivable for a first module to comprise a partially convexly or concavely curved edge which abuts against a wall of a second module which is curved concavely or convexly in a complementary manner hereto. An anti-drip device between the modules is realized as a result. Liquid when being removed out of a module is definitively prevented from running off between the modules and forming dangerous puddles under the cleaning cart.

Against said background it is conceivable for the modules also to be insertable into the basic body rotated by 180° and nevertheless to be able to abut against one another in a positive-locking manner. A rotation by 180° about a vertical z-axis can be necessary when the modules comprise different function regions on oppositely situated vertical sides. Two regions, namely front and rear, which have different functionalities, can be assigned to one module, e.g. a bucket or a storage container.

Thus, in the case of a bucket, for example the front side can be developed as a spout, whilst the rear side serves for receiving a mop press. In the case of a storage container, the front part can be assigned to the opening and removal of the cleaning utensils located therein, whilst the rear part of the receiving means serves for receiving a cover.

Depending on the cleaning application, it can be necessary for the one or other function region, for example directed outward, to be able to be turned to the user. This can be the case for ergonomic reasons.

At least one module could be developed as a transport container. Transport containers allow the direct and captive receiving of liquids or objects.

At least one module could be developed as a transport container with an upwardly directed opening. Cleaning liquid is able be transported easily in this manner. The transport container can be developed as a bucket or mop box.

The transport container could be realized in a conical manner, namely widening toward its opening in size. As a result, an anti-drip device is ensured when namely a widened upper edge of one module projects beyond a lower-lying edge of a further module.

The basic body could be realized as a scaffold-like element with four main webs and at least one saddle strut, wherein the saddle strut extends between two main webs thus forming at least one recess. The module can be fitted onto the saddle strut.

A saddle strut within the framework of said description is also to be understood as a saddle strut which is not continuous. In addition, it does not forcibly have to form a downwardly open opening. It can also be just an indentation in the sense of a pocket which enables the positive-locking connection on the predominantly vertical inner wall of the opening. The saddle strut can also be formed by two strut stubs which project from the side toward the middle of the cleaning cart. The saddle strut can also be realized in an elevated manner, extending upward.

A latching means in the form of a latching lug, which latches the module in the opening by way of its outside surface, can be arranged on an inner wall of the opening.

The saddle strut could be realized as a handle and as a result differ from the main webs. The saddle strut realized as a handle could be realized in a thinner manner than the main web. It is also conceivable for the saddle strut to be provided with a fluting.

It is also conceivable for a coupling element to be used in order to couple two cleaning carts of the type described here to one another. The coupling is preferably effected by means of the saddle strut. The coupling element can take two saddle struts of two cleaning carts.

FIG. 1 shows four views, namely three side views and one top view, of a cleaning cart, including a basic body 1, wherein the lateral extent of the basic body 1 is defined by an outside peripheral boundary surface 2 or boundary line and wherein the basic body 1 carries at least one module 3 which is couplable to the basic body 1.

The module 3 is assigned to the basic body 1 in such a positive-locking, frictional and/or friction-locking manner so as to be tip-resistant that the bottom region of the module 3 projects beyond the boundary surface 2 or the boundary line of the basic body 1 at least on one side. Consequently, the module 3 overlaps at the side. Said module projects beyond the basic body 1.

The basic body 1 provides support to at least one module 3 in the vertical direction, wherein the tilt stability of the module 3 is provided by a vertical positive-locking connection between the basic body 1 and the module 3.

Figure 2:
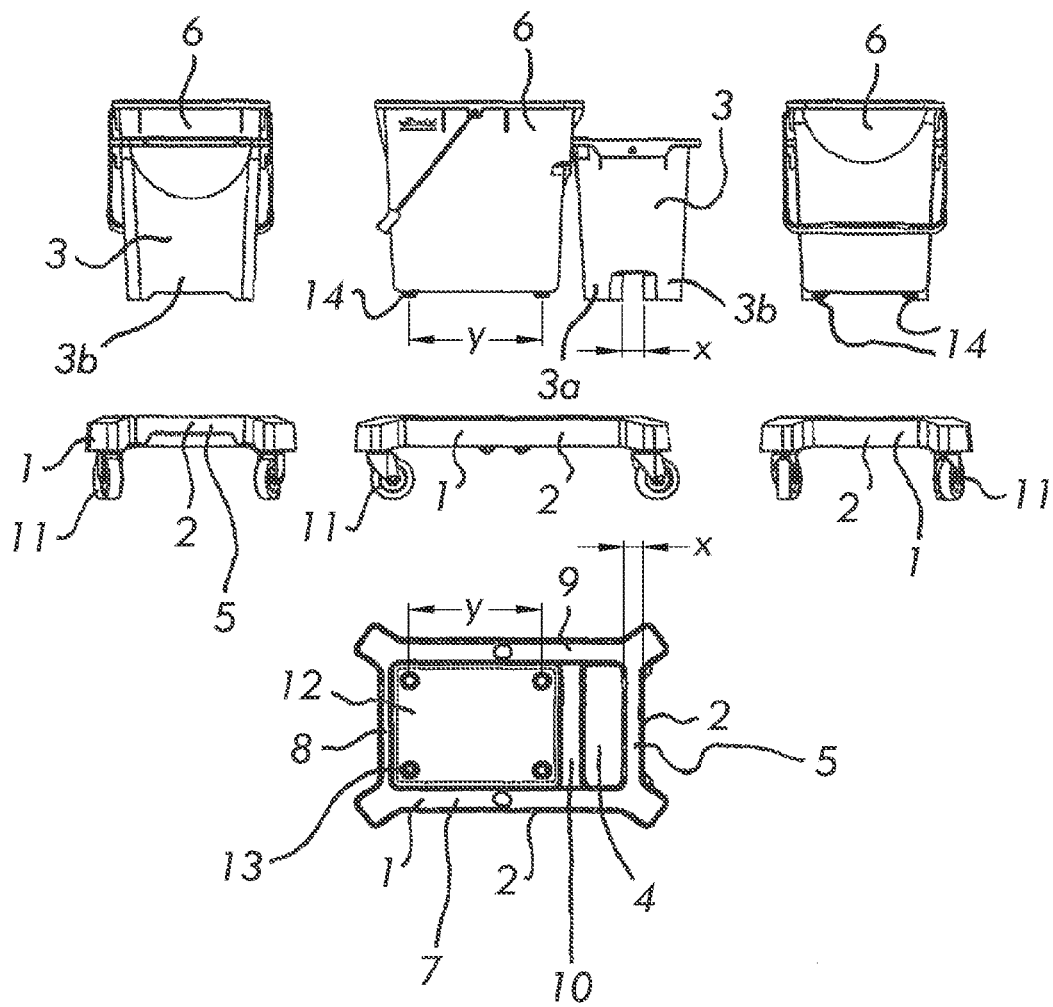
FIG. 2 shows three views of the basic body and of the modules in the top half, these being shown separately from one another, and a top view of the basic body without any module in the bottom half.

The bottom half of FIG. 2 shows that at least one recess 4 in which the module 3 is inserted is realized in the basic body 1.

The module 3 engages in the recess 4 by way of part 3a of its body, wherein another part 3b projects beyond the boundary surface 2 or boundary line. This is shown in the middle views of the top half of FIGS. 1 and 2.

The bottom half of FIG. 2 shows that that the basic body 1 comprises at least one saddle strut 5 onto which the module 3 is fitted. The module 3 encompasses the saddle strut 5 in a u-shaped manner with two leg elements 3a, 3b.

One leg element 3a abuts by way of one side against the saddle strut 5 and by way of the other side against an inner main web 10, as is shown in the bottom half of FIG. 2. A positive-locking connection is produced as a result.

At least two modules 3, 6 are received in the basic body 1, wherein a first module 3 is supported against tilting against a second module 6. In this connection, the modules 3, 6 are realized in a complementary manner with respect to one another. The edge of the first module 3 abuts with a precision fit against the wall of the second module 6. A positive-locking connection is also produced as a result.

At least two modules 3, 6 are received in the basic module 1, wherein the modules 3, 6 are realized in a complementary manner with respect to one another such that they abut against one another thus forming a positive-locking connection. This is shown in the middle view in the top half of FIG. 1.

At least one module 3, 6 is developed as a transport container with an upwardly directed opening, namely as a bucket-like receptacle.

The transport containers are realized in a conical manner, namely widening in size toward their opening. The second module 6 projects beyond the first module 3, the edge of the second module 6 partially covering the edge of the first module 3. An anti-drip device is realized as a result. This is shown in the middle view in the top half of FIG. 1.

The basic body 1 is realized as a scaffold-like and plate-like element with four main webs 7, 8, 9, 10 and at least one saddle strut 5, wherein the saddle strut 5 extends between two main webs 7, 9 thus realizing at least one recess 4.

The bottom half in FIG. 2 shows that a recess 4 is realized in the basic body 1. A plate 12, in which holes or bores 13 are realized, is provided along with the recess 4, separated by the inner main web 10. The second module 6 is received in a positive-locking manner in the holes or bores 13. For this purpose, on its bottom region, the second module 6 comprises domes 14 which are pluggable into the holes or bores 13.

The saddle strut 5 is realized as a handle and as a result differs from the main webs 7, 8, 9, 10. The saddle strut 5 is realized in a thinner manner than the main webs 7, 8, 9, 10 and comprises a fluting. The basic body 1 has associated therewith wheels 11.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A cleaning cart, comprising:
   a basic body, wherein a lateral extent of the basic body is defined by an outside peripheral boundary surface or boundary line, and
   a module arranged on the basic body in such a positive-locking, frictional, or friction-locking manner, or a combination of two or more of any of these manners, so as to be tip-resistant,
   wherein the module includes a bottom region and a body, the body including an engagement part,
   wherein the bottom region of the module projects beyond the boundary surface or the boundary line of the basic body at least on one side,
   wherein a further part of the module projects beyond the boundary surface or boundary line,
   wherein the basic body includes a recess,
   wherein the module is inserted in the recess,
   wherein the engagement part engages in the recess, and
   wherein the basic body includes a plate including holes or bores, along with the recess, separated by an inner main web.

2. The cart of claim 1, wherein the basic body provides support to the module in the vertical direction, and
   wherein a tilt stability of the module is provided by a vertical positive-locking connection between the basic body and the module.

3. The cart of claim 1, wherein the basic body includes a saddle strut,
   wherein the module is fitted onto the saddle strut, and
   wherein the module encompasses the saddle strut in a u-shaped manner with two leg elements.

4. The cart of claim 1, further comprising a second module,
   wherein the module is supported by tilting against the second module.

5. The cart of claim 1, further comprising a second module,
   wherein the modules are realized in a complementary manner with respect to one another such that they abut against one another thus realizing a positive-locking connection.

6. The cart of claim 1, wherein the module is present as a transport container.

7. The cart of claim 6, wherein the module is present as a transport container including an upwardly directed opening.

8. The cart of claim 6, wherein the transport container is conical.

9. The cart of claim 6, wherein the transport container is conical, and
   wherein the transport container increases in circumference toward an opening of the transport container.

10. The cart of claim 1, wherein the basic body is configured as a scaffold-like element,
    wherein the scaffold-like element includes four main webs and a saddle strut, and
    wherein the saddle strut extends between two main webs, thus forming at least one recess.

11. The cart of claim 10, wherein the saddle strut is a handle and differs from the main webs.

12. The cart of claim 1, further comprising a second module.

13. The cart of claim 1, wherein the lateral extent of the basic body is defined by the outside peripheral boundary surface.

14. The cart of claim 1, wherein the lateral extent of the basic body is defined by the outside peripheral boundary line.

15. The cart of claim 1, wherein the module is arranged on the basic body in the positive-locking manner.

16. The cart of claim 1, wherein the module is arranged on the basic body in the frictional manner.

17. The cart of claim 1, wherein the module is arranged on the basic body in the friction-locking manner.

18. The cart of claim 1, further comprising a second module,
   wherein second module is received in a positive-locking manner in the holes or bores.

19. The cart of claim 18, wherein the second module includes domes which are configured to be plugged into the holes or bares.

\* \* \* \* \*